United States Patent
Umay et al.

(10) Patent No.: US 12,254,350 B2
(45) Date of Patent: *Mar. 18, 2025

(54) DECENTRALIZED DATA PLATFORM

(71) Applicant: Microsoft Technology Licensing, LLC, Redmond, WA (US)

(72) Inventors: Mehmet Kadri Umay, Redmond, WA (US); Anirudh Badam, Issaquah, WA (US); Philipp Andre Witte, Bellevue, WA (US); Imran Siddique, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/540,394

(22) Filed: Dec. 14, 2023

(65) Prior Publication Data
US 2024/0111580 A1 Apr. 4, 2024

Related U.S. Application Data

(63) Continuation of application No. 17/354,200, filed on Jun. 22, 2021, now Pat. No. 11,886,913.

(51) Int. Cl.
*G06F 9/48* (2006.01)
*G06F 16/28* (2019.01)
*G06F 21/62* (2013.01)

(52) U.S. Cl.
CPC .......... *G06F 9/4881* (2013.01); *G06F 16/285* (2019.01); *G06F 21/6218* (2013.01)

(58) Field of Classification Search
CPC .. G06F 9/4881; G06F 16/285; G06F 21/6218; G06F 16/256
See application file for complete search history.

(56) References Cited

U.S. PATENT DOCUMENTS

| | | | |
|---|---|---|---|
| 8,510,807 B1 * | 8/2013 | Elazary | G06Q 30/06 709/224 |
| 10,200,495 B2 * | 2/2019 | Le Faucheur | H04L 67/01 |
| 10,621,130 B1 * | 4/2020 | Lockard | G06F 9/4881 |

(Continued)

OTHER PUBLICATIONS

Non-Final Office Action mailed on Mar. 11, 2024, in U.S. Appl. No. 17/355,568, 15 pages.
(Continued)

*Primary Examiner* — J. Brant Murphy

(57) ABSTRACT

Data from data sources may be processed at an edge device. The edge device may generate a local processing result, filter the data, and/or prioritize the data. Accordingly, data is transmitted from the edge device to the data platform, where it may be processed further. For example, a local processing result may be processed at the data platform, such that processing is performed without all of the data source data. In examples, at least a part of such data may remain at an edge device. The edge device may maintain a manifest of data stored by the edge device. The data platform may generate an aggregated manifest using manifests from associated edge devices, such that it may be determined where data is stored. As a result, the data platform may redirect requests to an associated edge device when it is determined that requested data is remote from the data platform.

20 Claims, 12 Drawing Sheets

(56) References Cited

U.S. PATENT DOCUMENTS

| | | | |
|---|---|---|---|
| 2003/0195920 A1* | 10/2003 | Brenner | G06F 9/526 |
| | | | 718/107 |
| 2011/0154290 A1* | 6/2011 | Kelly | G06F 9/44505 |
| | | | 717/110 |
| 2011/0218974 A1* | 9/2011 | Amit | G06F 11/1469 |
| | | | 707/693 |
| 2013/0339314 A1* | 12/2013 | Carpentier | G06F 3/0641 |
| | | | 707/E17.005 |
| 2017/0149922 A1* | 5/2017 | Le Faucheur | H04L 67/01 |
| 2019/0065545 A1* | 2/2019 | Hazel | G06F 16/2282 |
| 2019/0266170 A1* | 8/2019 | Hazel | G06F 16/221 |
| 2020/0225655 A1* | 7/2020 | Cella | G05B 19/41875 |
| 2021/0064016 A1* | 3/2021 | Manturana | G05B 23/0227 |
| 2021/0064446 A1* | 3/2021 | McKenney | G06F 9/526 |
| 2021/0157858 A1* | 5/2021 | Stevens | G06F 40/279 |
| 2021/0373914 A1* | 12/2021 | Hoh | G06F 16/28 |

OTHER PUBLICATIONS

Notice of Allowance mailed on Jul. 30, 2024, in U.S. Appl. No. 17/355,568, 09 pages.

* cited by examiner

DECENTRALIZED DATA PLATFORM

CROSS-REFERENCE TO RELATED APPLICATIONS

This application is a continuation of U.S. patent application Ser. No. 17/354,200, filed on Jun. 22, 2021, the disclosure of which is hereby incorporated by reference in its entirety.

BACKGROUND

In examples, data from various data sources is aggregated at a data platform. However, aggregation and processing are typically performed in sequence, such that the data from the data sources is first centralized prior to processing. However, this may lead to processing delays or may be infeasible in certain environments. For example, bandwidth between a data source and the data platform may be limited, such that it is difficult or impossible to transmit the amount of data generated by the data source to the data platform for processing within a reasonable timeframe.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to a decentralized data platform. In examples, data from data sources may be processed at an edge device. The edge device may generate a local processing result, filter the data, and/or prioritize the data. Accordingly, data is transmitted from the edge device to the data platform, where it may be processed further. For example, a local processing result may be processed at the data platform, thereby enabling the data platform to perform processing without all of the data source data.

In examples, at least a part of such data may remain at an edge device. The edge device may maintain a manifest of data stored by the edge device. The data platform may generate an aggregated manifest using manifests from associated edge devices, such that it may be determined where data is stored. As a result, the data platform may redirect data requests to an associated edge device when it is determined that the requested data is stored remote from the data platform.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
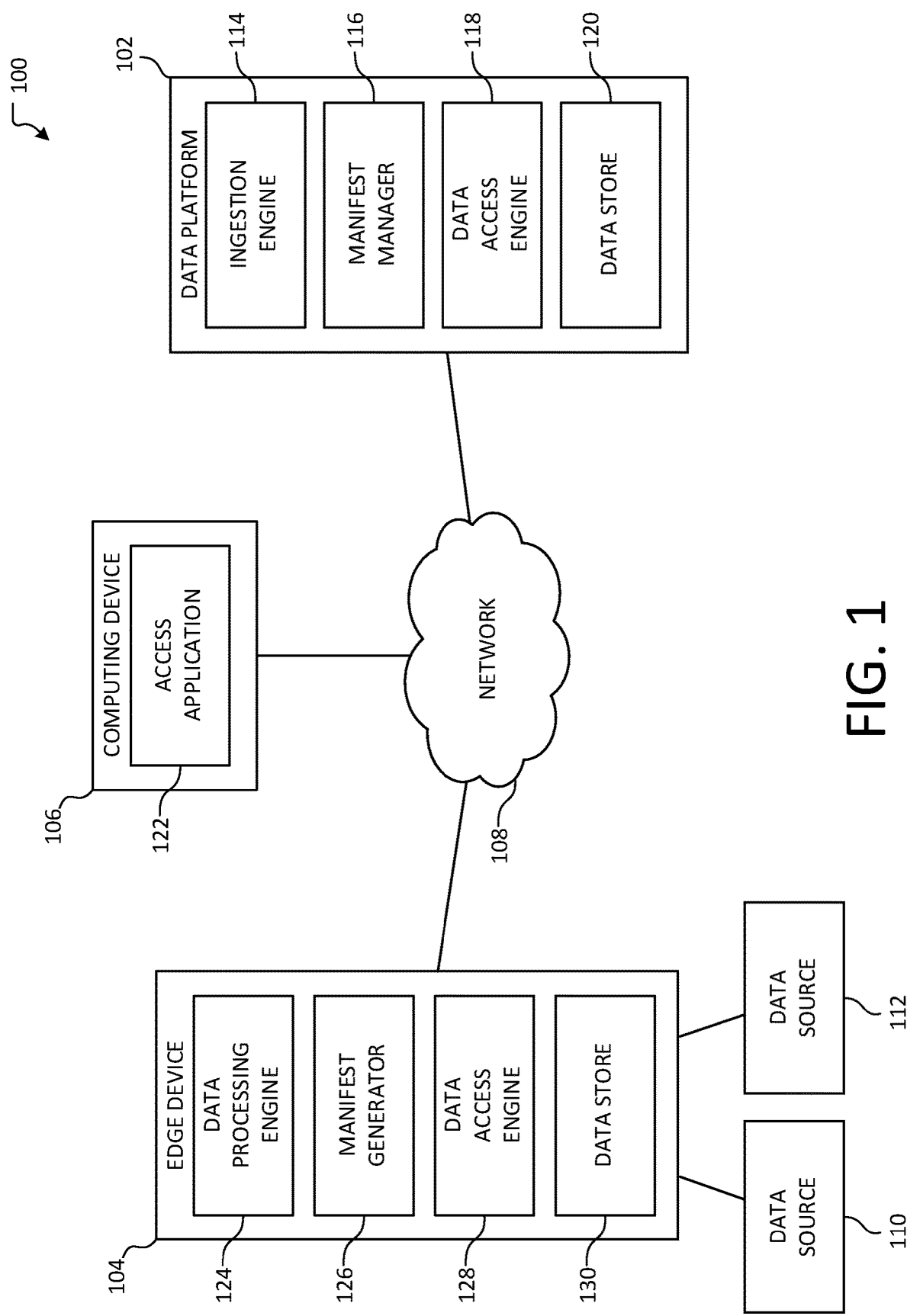
FIG. 1 illustrates an overview of an example system for aspects of the decentralized data platform described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, a set of data sources generates data that is processed by a data platform. Example data sources include, but are not limited to, drones, Internet-of-Things (IoT) devices, satellites, and network appliances (e.g., gateways, routers, and switches), among any of a variety of other devices. Data generated by such data sources includes, but is not limited to, text data, image data, video data, and/or audio data, among other examples. To process data from such potentially different and/or geographically dispersed data sources, data may be aggregated prior to processing by the data platform. However, it may not be technically feasible to aggregate the data within a reasonable timeframe, as may be the case when there is a large amount of data, the data is generated on a substantially continual basis, and/or network limitations exist between one or more data sources and the data platform (e.g., an unreliable connection, a high-latency connection, and/or a low-bandwidth connection).

Accordingly, aspects of the present application relate to a decentralized data platform, where data from one or more data sources is processed by an edge device prior to aggregation by a data platform. For example, rather than transmitting all of the image data generated by a data source, the edge device may process the image data to identify a region of interest, such that the identified region is transmitted for aggregation and further processing by the data platform. Thus, the edge device may process data from associated data sources according to computer vision techniques, statistical modeling techniques, and/or machine learning techniques, such that the resulting local processing result is transmitted for aggregation by the data platform accordingly. In some instances, the data platform may generate a processing result (e.g., based on data from a data source and/or a local processing result from an edge device) that is transmitted back to an edge device, such that the edge device stores the platform processing result in association with data at the edge device. In a further example, data may be filtered according to a set of filtering criteria.

Thus, generation of local processing results (e.g., local to various edge devices associated with the data platform) may enable subsequent, more centralized analysis by a data platform while reducing the amount of data (and, by extension, utilization of associated computing resources) that is transmitted to the data platform. In a further example, similar techniques may be used to prioritize data for aggregation by the data platform, such that data is transmitted by the edge node in successive groups, where earlier groups comprise data that is identified to have a higher priority as compared to data of subsequent groups. Thus, data transmitted by an edge device to a data platform may comprise data from a data source as well as local processing results generated by the edge device, among other examples.

In some instances, data need not be transmitted to the data platform and may instead remain at the edge device. For example, the edge device may maintain a manifest associated with data stored by the edge device. The data platform may generate an aggregated manifest based on manifests of associated edge devices, as well as data stored by the data platform. As a result, the aggregated manifest may be used to process requests for data and, for example, redirect requests to edge devices as necessary. Thus, processing and data storage for data associated with the data platform need not be centralized and may instead be processed, stored, and available for access at any of a variety of locations.

FIG. 1 illustrates an overview of an example system 100 for aspects of the decentralized data platform described herein. As illustrated, system 100 comprises data platform 102, edge device 104, computing device 106, and network 108. In examples, data platform 102, edge device 104, and computing device 106 communicate via network 108, which may comprise a local area network, a wireless network, or the Internet, or any combination thereof, among other examples.

System 100 is further illustrated as comprising data source 110 and data source 112, each of which may provide data to edge device 104. In examples, data sources 110 and 112 may be any of a variety of devices, including, but not limited to, a drone, a satellite, or an Internet-of-Things (IoT) device. While system 100 depicts data sources 110 and 112 as separate from edge device 104, it will be appreciated that, in other examples, edge device 104 may comprise a data source or data may be received by edge device 104 from any of a variety of other devices. Further, while system 100 is illustrated as comprising two data sources 110 and 112, it will be appreciated that any number of data sources may be used.

In examples, data sources 110 and 112 generate or otherwise provide data to edge device 104. Data from data sources 110 and 112 may be stored in data store 130. Data processing engine 124 of edge device 104 may process the data according to any of a variety of computer vision techniques, statistical modeling techniques, machine learning techniques, and/or filtering criteria to generate a local processing result. For example, data processing engine 124 may generate local processing results substantially contemporaneously with the receipt of data from data sources 110 and 112 or, as another example, may process the data in batches (e.g., according to a predetermined schedule or based on the occurrence of an event). In some examples, at least a part of the processing performed by data processing engine 124 may be user-configurable, for example in accordance with a specific type of data generated by data sources 110 and 112, or an analysis to be performed by data platform 102, among other examples. Data processing engine 124 may provide an application programming interface (API) that is usable to customize behavior of data processing engine 124 accordingly.

As a further example, data processing engine 124 may generate one or more groups of data and/or associated local processing results, such that data may be transmitted to data platform 102 according to the generated groups. For example, a first group may be transmitted to data platform 102 substantially contemporaneously with its generation, whereas data in a second, lower priority group may be transmitted to data platform 102 as permitted by available computing resources. In some instances, the processing performed by data platform 102 using the first group of data may be higher priority than the processing performed using the second group of data. It will be appreciated that any number of such data groupings may be used. Further, priorities need not be distinct among groups. For example, a first group may have a higher priority than both a second group and a third group, while the second and third group may each have the same priority.

Edge device 104 is further illustrated as comprising manifest generator 126, which may generate, update, or otherwise maintain a manifest for edge device 104. For example, the manifest may be associated with data received from data sources 110 and 112, as well as local processing results generated by data processing engine 124. The manifest may comprise an indication as to the data stored by edge device 104, such that data platform 102 may use the manifest to determine whether data is stored by edge device 104. For example, the manifest may comprise at least a part of the metadata associated with data of edge device 104. While edge device 104 is illustrated as comprising a single data store 130, it will be appreciated that, in other examples, multiple data stores may be used, such that the manifest may comprise an indication as to the data store in which the data is stored.

In examples, data processing engine 124 transmits data (e.g., from data sources 110 and 112) and/or local processing results (e.g., as may be generated by data processing engine 124) to data platform 102, which may be stored in data store 120 by ingestion engine 114 accordingly. The manifest associated with edge device 104 (e.g., as generated by manifest generator 126) may similarly be transmitted to data platform 102, where it is processed by manifest manager 116. For example, manifest manager 116 may process manifests from edge devices associated with data platform 102 to generate an aggregated manifest. The aggregated manifest may comprise associations between data and a location at which the data is stored. For example, the aggregated manifest may comprise an indication as to data stored by data store 120 of data platform 102 as well as data stored by data store 130 of edge device 104.

Accordingly, data access engine 118 may use the aggregated manifest maintained by manifest manager 116 when processing data requests (e.g., from access application 122 of computing device 106). For example, if data access engine 118 determines requested data is stored in data store 120 of data platform 102, data access engine 118 may provide at least a part of the data in response. By contrast, if data access engine 118 instead determines that requested data is stored in data store 130 of edge device 104, data access engine 118 may instead provide a redirection indication usable by access application 122 to access the data from edge device 104. For example, the redirection indication may comprise an identifier associated with edge device 104 (e.g., a uniform resource locator (URL) or a globally unique identifier (GUID)) usable by access application 122 to retrieve data from edge device 104.

In examples, the redirection indication may comprise an authorization token that may be validated by data access engine 128 of edge device 104 prior to providing data from data store 130. In another example, the redirection indication may comprise an indication as to the requested data or, as another example, data access engine 128 may utilize a manifest generated by manifest generator 126 to identify data in data store 130 that is responsive to the request. It will be appreciated that such authentication techniques are provided as an example and, in other examples, any of a variety of additional or alternative techniques may be used to validate a data request by an edge device. Other aspects of data access engine 128 may be similar to those of data access engine 118 and are therefore not necessarily re-described in detail.

In some instances, the aggregated manifest of data platform 102 may be more general than the manifest of edge device 104. For example, the aggregated manifest may comprise an association between data and an edge device, whereas an edge device manifest may indicate a specific data store in which data is stored. Thus, while data platform 102 and edge device 104 are each illustrated as comprising a single data store, it will be appreciated that any number of data stores may be used in other examples.

Computing device 106 is illustrated as comprising access application 122. In examples, access application 122 is usable to browse data and/or search for data associated with data platform 102 (e.g., as may be stored by data platform 102 and/or edge device 104), among other examples. User input of a search query may be received by access application 122, such that access application 122 may provide an indication of the received user input to data platform 102. A search query may comprise any of a variety of criteria, for example relating to data and/or associated metadata. Accordingly, data access engine 118 may use an aggregated manifest generated by manifest manager 116 to identify data that is responsive to the user input.

In examples where the data is stored by data platform 102, access application 122 may obtain the data from data platform 102. For example, data access engine 118 may provide at least a part of the identified data in response to the request discussed above. In examples, access application 122 implements any of a variety of data formats and/or transfer protocols, such as those discussed above with respect to data access engine 118. Thus, access application 122 may provide an indication to data platform 102 as to a format and/or transfer protocol, such that data access engine 118 may provide data from data store 120 in accordance with the indicated format and/or protocol.

In instances where data access engine 118 determines the data is stored at an edge device, access application 122 may instead receive a redirection indication. Access application 122 may use the redirection indication to request the data from an indicated edge device (e.g., edge device 104). In some instances, access application 122 may provide an authorization token that was received as part of the redirection indication. As another example, access application 122 may provide user credentials or any of a variety of additional or alternative authentication information usable by edge device 104 to validate the data request.

While examples are described in which access application 122 of computing device 106 is used by a user to access data stored by data platform 102, it will be appreciated that data may be programmatically retrieved from data platform 102 using similar techniques. Thus, any of a variety of devices and/or associated applications may access data of data platform 102.

Figure 2:
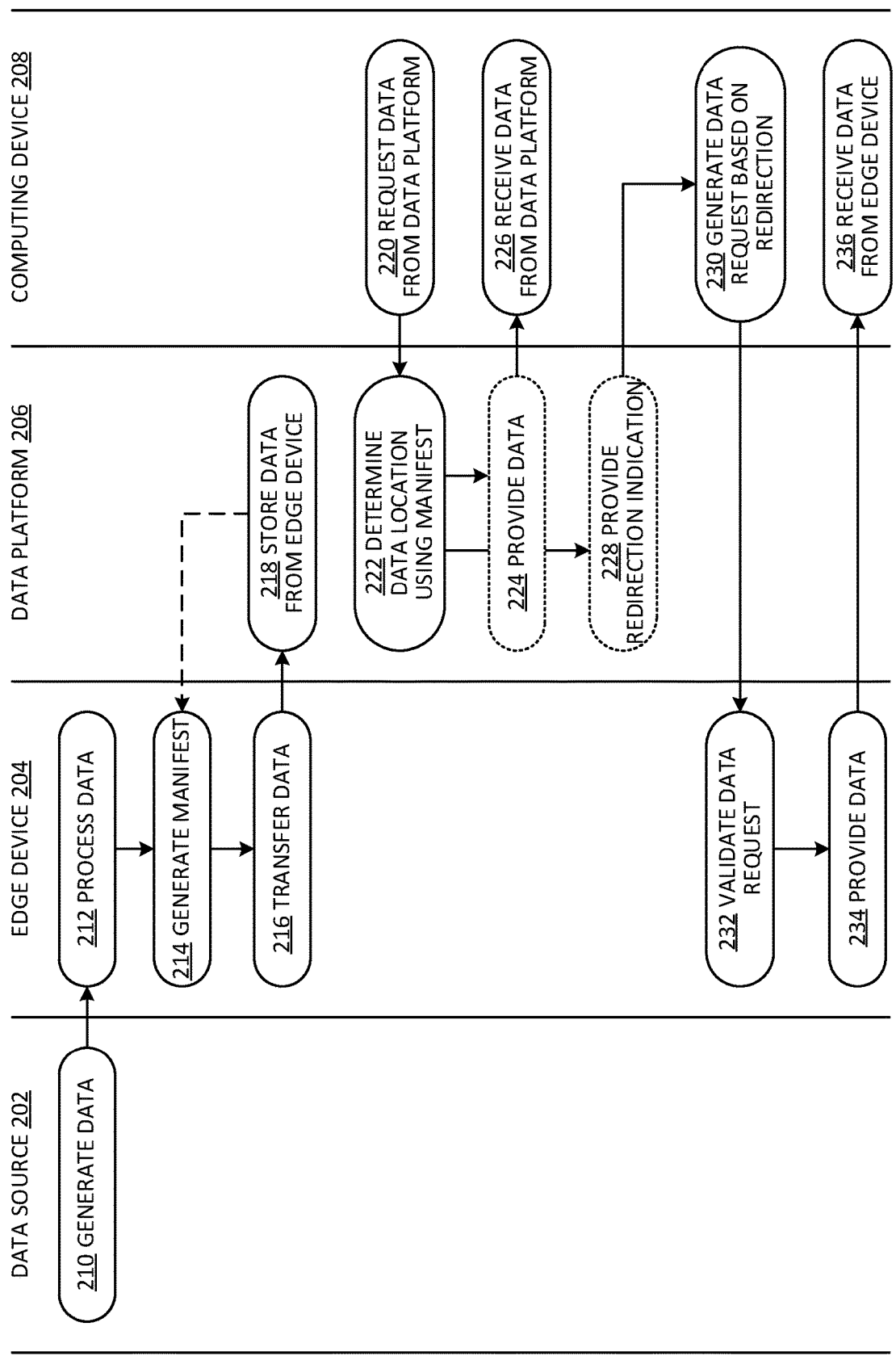
FIG. 2 illustrates an overview of an example flow according to the decentralized data platform described herein.

FIG. 2 illustrates an overview of an example flow 200 according to the decentralized data platform described herein. As illustrated, flow 200 occurs between data source 202, edge device 204, data platform 206, and computing device 208. Data source 202, edge device 204, data platform 206, and computing device 208 may be similar to data sources 110 and 112, edge device 104, data platform 102, and computing device 106, respectively, and are therefore not necessarily re-described in detail below.

Flow 200 begins at operation 210, where data source 202 generates data. For example, data source 202 may generate data substantially continually, periodically, or in response to any of a variety of events, among other examples. Accordingly, edge device 204 processes the data at operation 212. For example, the data may be processed by a data processing engine, similar to data processing engine 124 discussed above with respect to FIG. 1. A local processing result may be generated based on the data from data source 202. In some instances, operation 212 may comprise determining one or more groups of data to transfer to data platform 206.

At operation 214, edge device 204 generates a manifest. The manifest maybe generated by a manifest generator, similar to manifest generator 126 discussed above with respect to FIG. 1. For example, the manifest may comprise an indication of the data that is stored at edge device 204. In instances where data is identified for transfer to data platform 206, the generated manifest may comprise an indication that the data is present on edge device 204 but will ultimately be stored by data platform 206.

Data is transferred from edge device 204 at operation 216, at which point data platform 206 stores the data at operation 218. Operations 216 and 218 may further comprise transmitting and processing the manifest generated at operation 214. In examples, the manifest may be updated as data is transmitted to data platform as part of operation 218, as illustrated by the dashed arrow from operation 218 to operation 214. In such examples, the manifest may reflect that the data is accessible from edge device 204 until the data has been transferred to data platform 206. The updates may be in the form of a full updated manifest or may comprise changes. Flow may loop between operations 214, 216, and 218 while data is transferred from edge device 204 to data platform 206, for example according to priority as may be indicated by one or more groups.

Flow 200 further comprises operation 220, where computing device 208 requests data from data platform 206. In examples, the request comprises an indication usable to identify data at data platform 206, such as a search query or an identifier associated with a specific record of data. At operation 222, data platform 206 determines the location of the requested data using an aggregated manifest, as may have been generated by a manifest manager (e.g., manifest manager 116 in FIG. 1). For example, data that has been transferred from edge device 204 to data platform 206 as a result of operation 216 may be determined to be stored by data platform 206 (and may not be present in a manifest provided by edge device 204 as a result). By contrast, data that remains on edge device 204 may be present in the manifest received by data platform 206, such that it may be determined that the data is not stored by data platform 206.

Accordingly, two arrows are illustrated from operation 222 to either operation 224 in instances when the data is stored by data platform 206 or operation 228 in instances when the data is stored by edge device 204. In instances where flow 200 progresses to operation 224, the response data is provided by data platform 206, such that computing device 208 receives the data at operation 226. As discussed above, at least a part of the data may be provided by data platform 206 or, as another example, data platform 206 may provide information usable by computing device 208 to access the requested data. In some instances, operation 224 comprises providing the data in a format indicated by computing device 208, as may have been included in the request discussed above with respect to operation 220.

In other examples, flow may instead progress from operation 222 to operation 228, where a redirection indication is provided to computing device 208. The redirection indication may comprise an identifier associated with edge device 204, such that computing device 208 may use the identifier to communicate with edge device 204 accordingly. In some instances, at least a part of the identifier may be information from an aggregated manifest of data platform 206. The redirection indication may further comprise an authorization token or other authentication information usable by computing device 208 to authenticate with edge device 204.

Accordingly, computing device 208 generates a data request at operation 230 based on the redirection indication that was provided by data platform 206. In examples, the request comprises similar aspects to the request discussed above with respect to operation 220, which was initially provided to data platform 206. The request may comprise the authorization token or other authentication information that was received from data platform 206 or, as another example, the request may comprise additional or alternative authentication information from computing device 208 (e.g., as may be stored on computing device 208 or obtained from an associated user).

At operation 232, edge device 204 validates the data request. For example, authentication information received as part of the request may be processed to determine whether to permit access to data of edge device 204 by computing device 208. In examples, edge device 204 evaluates an authorization token that was generated by data platform 206. In other examples, operation 232 may comprise a communication between edge device 204 and data platform 206. Thus, any of a variety of techniques may be used to validate the data request.

If the request is validated, flow progresses to operation 234, where response data is provided such that computing device 208 receives the data accordingly at operation 236. Such aspects are similar to operations 224 and 226 discussed above.

Figure 3A:
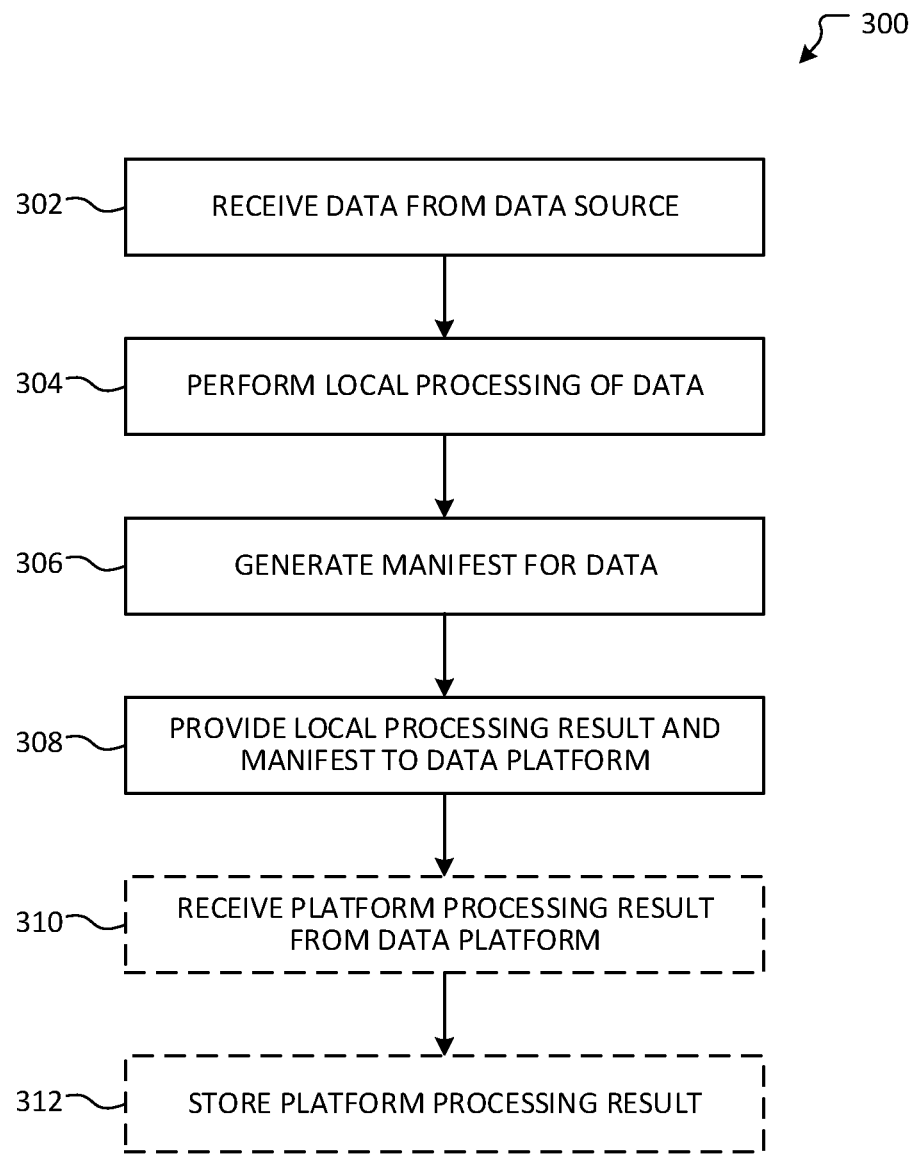
FIG. 3A illustrates an overview of an example method for processing data from a data source at an edge device according to aspects of the present disclosure.

FIG. 3A illustrates an overview of an example method 300 for processing data from a data source at an edge device (e.g., edge device 104 or 204 discussed above with respect to FIGS. 1 and 2, respectively) according to aspects of the present disclosure.

Method 300 begins at operation 302, where data is received from a data source such as data source 110 or data source 112 discussed above with respect to FIG. 1. For example, the data may be received as a result of the data source transmitting the data. As another example, the data may be stored at a storage location from which it is accessed at operation 302. In examples, the data is batch data and/or streaming data, among any of a variety of other data formats. Thus, it will be appreciated that any of a variety of techniques may be used to obtain data from a data source.

At operation 304, local processing of the data is performed. For example, the data may be processed by a data processing engine, such as data processing engine 124 of edge device 104 in FIG. 1. In examples, the data is processed according to computer vision techniques, statistical modeling techniques, and/or machine learning techniques. In some examples, operation 304 comprises filtering data and/or prioritizing the data into one or more groups, as described above.

Flow progresses to operation 306, where a manifest is generated. For example, the manifest may be generated by a manifest generator, such as manifest generator 126 discussed above with respect to FIG. 1. Such aspects may be similar to operation 214 discussed above with respect to FIG. 2. For example, the manifest may comprise an indication of the data that was received at operation 302 and/or one or more local processing results that were generated at operation 304.

At operation 308, a local processing result generated at operation 304 and the manifest generated at operation 306 are provided to a data platform. For example, the local processing result and manifest may be provided to the data platform using an API, as may be provided by an ingestion engine, such as ingestion engine 114 discussed above with respect to FIG. 1. In examples, operation 308 may comprise providing such information according to a prioritization that was determined at operation 304.

As a result of generating and providing the local processing result according to aspects described herein, less data may be transmitted to the data platform and/or higher priority data may be provided to the data platform more quickly than would otherwise be the case in instances where the data from the data source (e.g., that was received at operation 302) is provided in its entirety to the data platform. Even so, it will be appreciated that at least a part of the data that was received from the data source at operation 302 may ultimately be provided to the data platform, for example according to the prioritization techniques described herein.

In examples, method 300 may terminate at operation 308. In other examples, flow may loop between operations 302 and 304, such that data is aggregated and processed by the edge device, at which point flow may eventually progress to operations 306 and 308. For example, flow may progress to operations 306 and 308 as a result of identifying an anomaly within the data source data and/or local processing results. As another example, a manifest may be provided to the data platform periodically or as data is received from a data source, and a local processing result may be provided to the data platform in response to the identification of an anomaly. Thus, it will be appreciated that the operations discussed above with respect to method 300 are provided as an example and other similar techniques may be used in other examples.

In some instances, rather than terminating at operation 308, method 300 continues to operation 310 where a platform processing result is received from the data platform. For example, the data platform may process the local processing result and/or other data that was provided at operation 308 to generate a processing result, which may then be received at operation 310. Thus, data processing need not be restricted to local processing.

At operation 312, the platform processing result is stored. In some examples, operation 312 may comprise updating a manifest to comprise an indication that the platform processing result is stored in a data store (e.g., data store 130 of edge device 104 discussed above with respect to FIG. 1). In other examples, the data platform may update an aggregated manifest accordingly. Method 300 may terminate at operation 312.

Figure 3B:
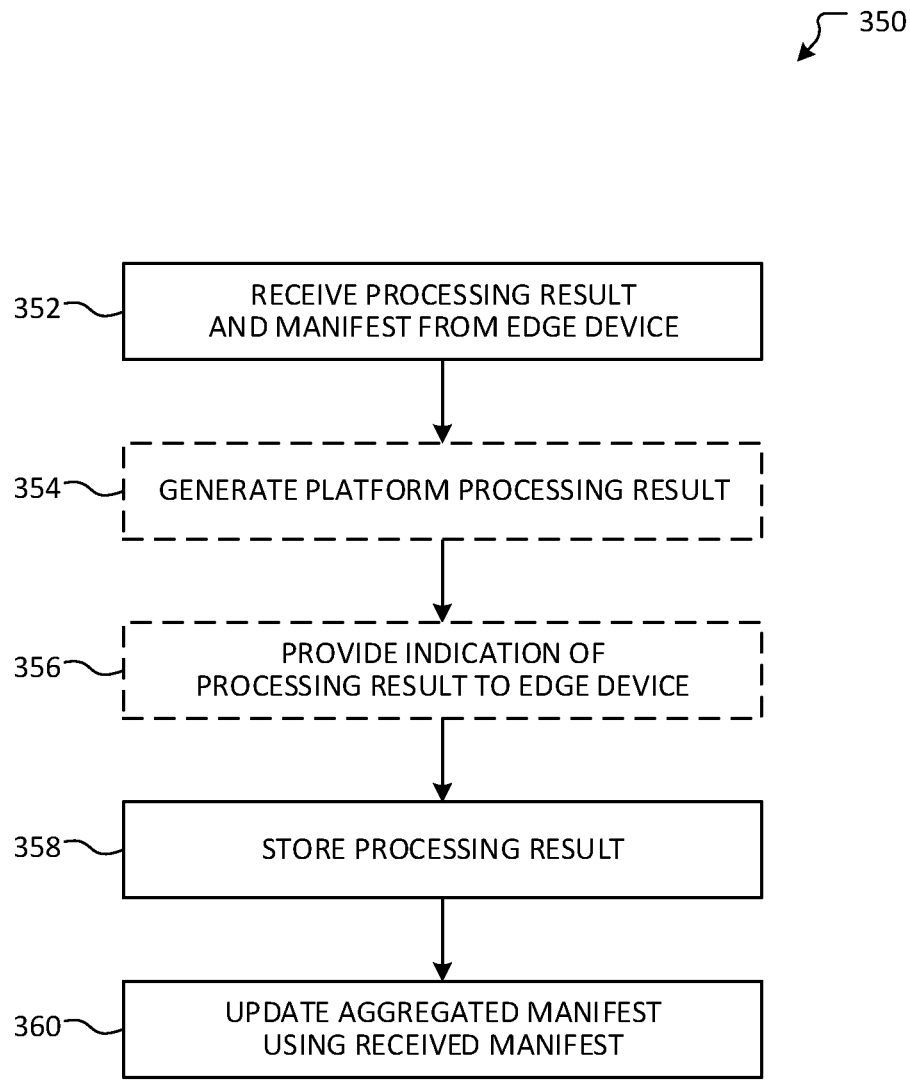
FIG. 3B illustrates an overview of an example method for processing data from a data source by a data platform according to aspects of the present disclosure.

FIG. 3B illustrates an overview of an example method 350 for processing data from a data source by a data platform according to aspects of the present disclosure. In examples, aspects of method 350 are performed by a data platform, such as data platform 102 or data platform 206 in FIGS. 1 and 2, respectively.

Method 350 begins at operation 352, where a processing result and a manifest are received from an edge device, such as edge device 104 or edge device 204 in FIGS. 1 and 2, respectively. In examples, operation 352 is performed with respect to multiple edge devices, such that processing results and manifests may be aggregated by the data platform. As another example, multiple instances of data may be received from the same edge device, as may be the case when an edge device is transmitting data according to the prioritization techniques described herein. For example, the edge device may be performing aspects of operation 216 or 308 discussed above with respect to FIGS. 2 and 3A, respectively.

At operation 354, a platform processing result is generated, for example based on one or more processing results that were received at operation 352. As discussed above, data source data may be received in addition to or as an alternative to such processing results, such that operation 354 may comprise processing data source data and/or processing results to generate the platform processing result. Given operation 352 may aggregate data from multiple edge devices, operation 354 may yield a platform processing result that is generated according to the data of multiple edge devices. Such aspects may yield additional insight as compared to the local processing that was performed by the edge devices.

At operation 356, an indication of the platform processing result generated at operation 354 is provided to an edge device. In examples, the indication is provided to the edge device from which data was received at operation 352. In some examples, operation 356 may comprise providing the processing result to multiple edge devices, as may be the case when data of multiple edge devices is used to generate the platform processing result. Operations 354 and 356 are illustrated using dashed boxes to indicate that, in other examples, they may be omitted. For example, the data platform need not generate a platform processing result or the platform processing result need not be provided back to an edge device.

At operation 358, a processing result is stored. For example, the processing result may be stored in a data store, such as data store 120 of data platform 102 discussed above with respect to FIG. 1. In examples, the processing result that is stored is that which was received at operation 352 and/or the platform processing result that was generated at operation 354.

Flow progresses to operation 360, where an aggregated manifest is updated based on the manifest that was received at operation 352. For example, the aggregated manifest may be updated to reflect that data received from the edge device is now stored at the data platform (e.g., as a result of performing operation 358). As another example, the aggregated manifest may be updated to indicate that a platform processing result was provided for storage by an edge device (e.g., as a result of performing operation 356). In examples, operation 360 comprises processing multiple manifests, each of which may have been received from a different edge device. If a conflict exists between manifests (e.g., such that multiple edge devices store the same data), the aggregated manifest may indicate that the data is available from the multiple edge devices, or a single edge device may be selected, among other examples. Method 350 terminates at operation 360.

Figure 4A:
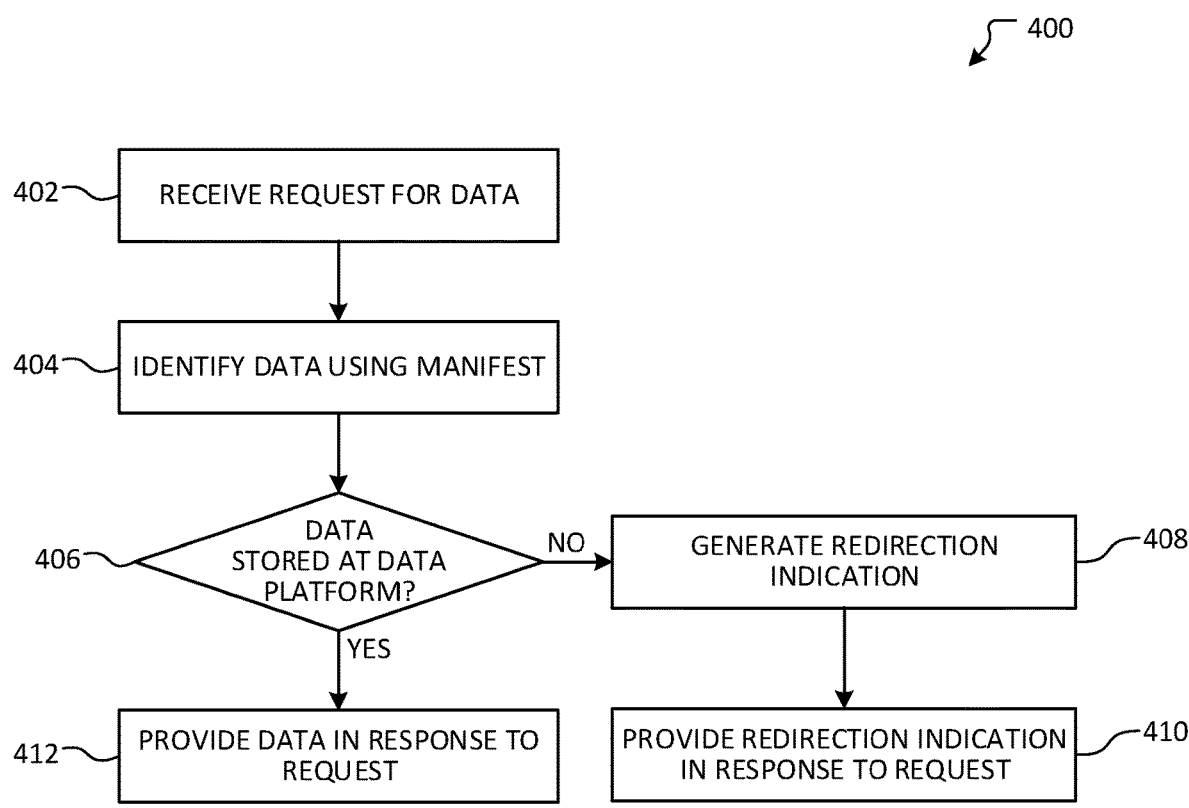
FIG. 4A illustrates an overview of an example method for processing a data request by a data platform according to aspects of the present disclosure.

FIG. 4A illustrates an overview of an example method 400 for processing a data request by a data platform according to aspects of the present disclosure. For example, aspects of method 400 may be performed by a data platform, such as data platform 102 or data platform 206 in FIGS. 1 and 2, respectively.

Method 400 begins at operation 402, where a request for data is received. For example, the request may be received from an access application, such as access application 122 discussed above with respect to FIG. 1. The request may comprise an indication usable to identify data, such as a search query or an identifier associated with a specific record of data. While example interactions are described with respect to user input, it will be appreciated that similar techniques may be used in instances where a data platform is programmatically accessed, among other examples.

At operation 404, data associated with the data request is identified using an aggregated manifest of the data platform. For example, the aggregated manifest may have been generated by a manifest manager, such as manifest manager 116 performing aspects of method 350 discussed above with respect to FIGS. 1 and 3B, respectively. The aggregated manifest may comprise an association between data associated with the data request and a location at which the data is stored.

Accordingly, at determination 406, it is determined whether the requested data is stored at the data platform. If it is determined that the data is stored at the data platform, flow progresses "YES" to operation 412, where the requested data is provided in response to the request. Such aspects may be similar to operation 224 discussed above with respect to FIG. 2. As an example, at least a part of the data may be provided or, as another example, information usable to access the requested data may be provided (e.g., a URL or shared storage of the data platform at which the data is located). In some instances, the data may be provided in a format that was indicated by the request that was received at operation 402. Method 400 terminates at operation 412.

However, if it is determined that the data is not stored by the data platform, flow instead branches "NO" to operation 408, where a redirection indication is generated. In examples, operation 408 comprises generating an authorization token that may enable access to the edge device at which the data is located. Such aspects may be similar to those discussed above with respect to the redirection indication of operation 228 in FIG. 2. As another example, operation 408 may comprise communicating with the edge device at which the data is stored, such that the edge device may be configured to permit access to the data or the edge device may provide an authorization token in response. Thus, it will be appreciated that any of a variety of techniques may be used to permit access to data stored by an edge node. As described above, the redirection indication may further comprise an identifier associated with the edge device and/or an identifier associated with the requested data.

At operation 410, the redirection indication is provided in response to the request, thereby enabling the device from which the request was received at operation 402 to access the data accordingly. Such aspects may be similar to operation 228 discussed above with respect to FIG. 2. Method 400 terminates at operation 410.

Figure 4B:
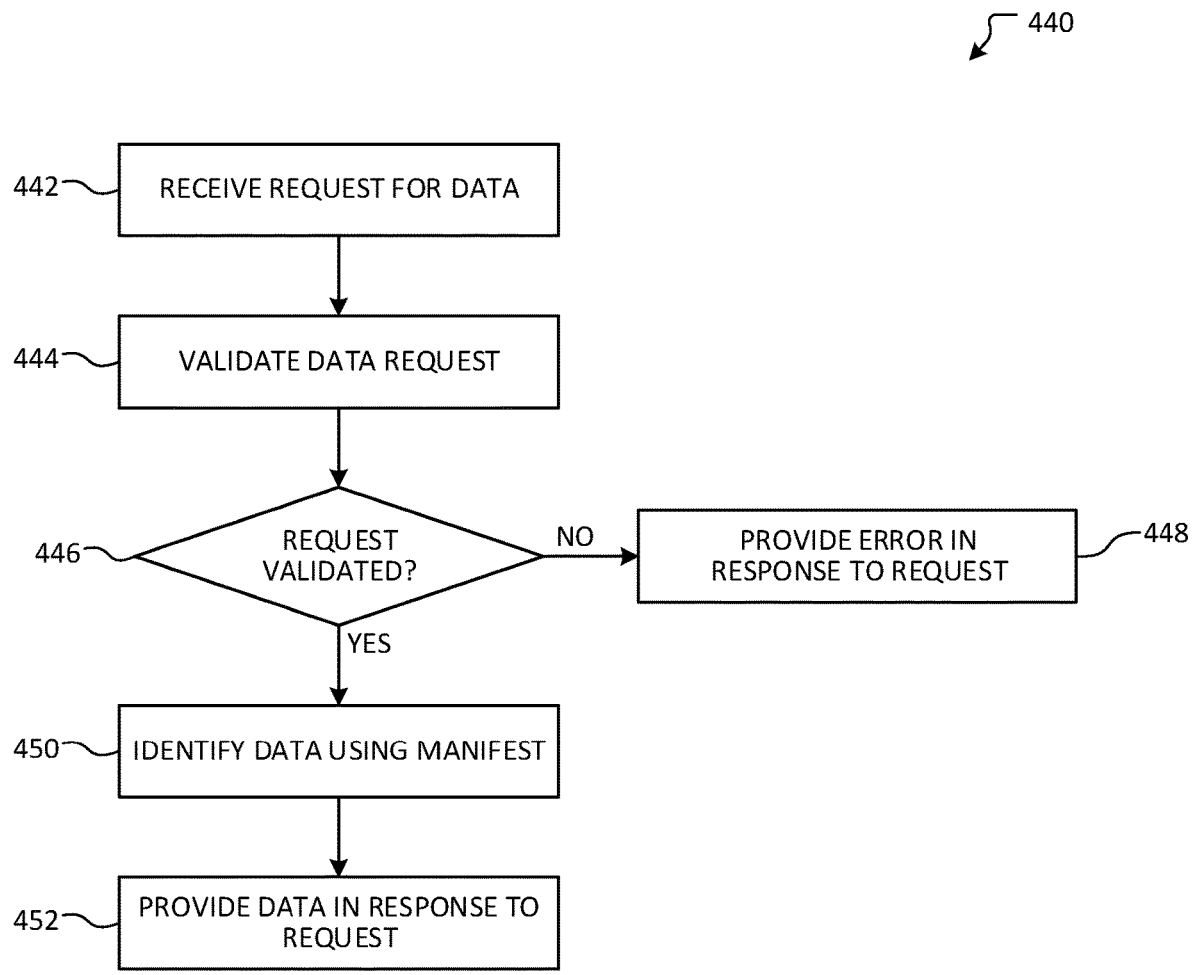
FIG. 4B illustrates an overview of an example method for processing a data request by an edge device according to aspects of the present disclosure.

FIG. 4B illustrates an overview of an example method 440 for processing a data request by an edge device according to aspects of the present disclosure. In examples, method 440 may be performed by an edge device similar to edge devices 104 or 204 discussed above with respect to FIGS. 1 and 2, respectively.

Method 440 begins at operation 442, where a request for data is received. The request may be similar to request 230 discussed above with respect to FIG. 2 or the request that was received at operation 402 of method 400 in FIG. 4A. In examples, the received request comprises an authorization token among any of a variety of alternative or additional authentication information. The request may comprise an indication of the data that is being requested.

At operation 444, the data request is validated. For example, authentication information received as part of the request may be processed to determine whether to permit access to the requested data. In examples where an authorization token was received as part of the request, the authorization token may be processed to determine whether the token is valid. For example, it may be confirmed that the token was issued by a data platform and has not expired. In other examples, operation 444 may comprise a communication with the data platform to verify aspects of the request that was received at operation 442, such as authentication information therein. As another example, additional information may be requested from the device from which the request was received at operation 442. Thus, any of a variety of techniques may be used to validate the data request.

At determination 446, it is determined whether the request was validated. If the request was not validated, flow branches "NO" to operation 448, where an error may be provided in response to the request. For example, the error may comprise a reason as to why validation failed or a recommendation as to how to resolve the error. Method 440 terminates at operation 448.

If, however, it is determined that the request was validated, flow instead branches "YES" to operation 450, where data is identified using a manifest of the edge device. For example, the manifest may comprise an indication as to where in a data store the data is located, such as data store 130 of edge device 104 discussed above in FIG. 1. In other examples, the request received at operation 442 may comprise an indication as to where the data is stored, as may be the case when the data platform provides such information as part of a redirection indication. Thus, in such instances, operation 450 may be omitted such that the data identified by the request is provided accordingly at operation 452 discussed below.

At operation 452, the data is provided in response to the request. Such aspects may be similar to operation 224 or operation 412 discussed above with respect to FIGS. 2 and 4A, respectively. As an example, at least a part of the data may be provided or, as another example, information usable to access the requested data may be provided (e.g., a URL or shared storage of the data platform at which the data is located). In some instances, the data may be provided in a format that was indicated by the request that was received at operation 442. Method 440 terminates at operation 452.

Figure 4C:
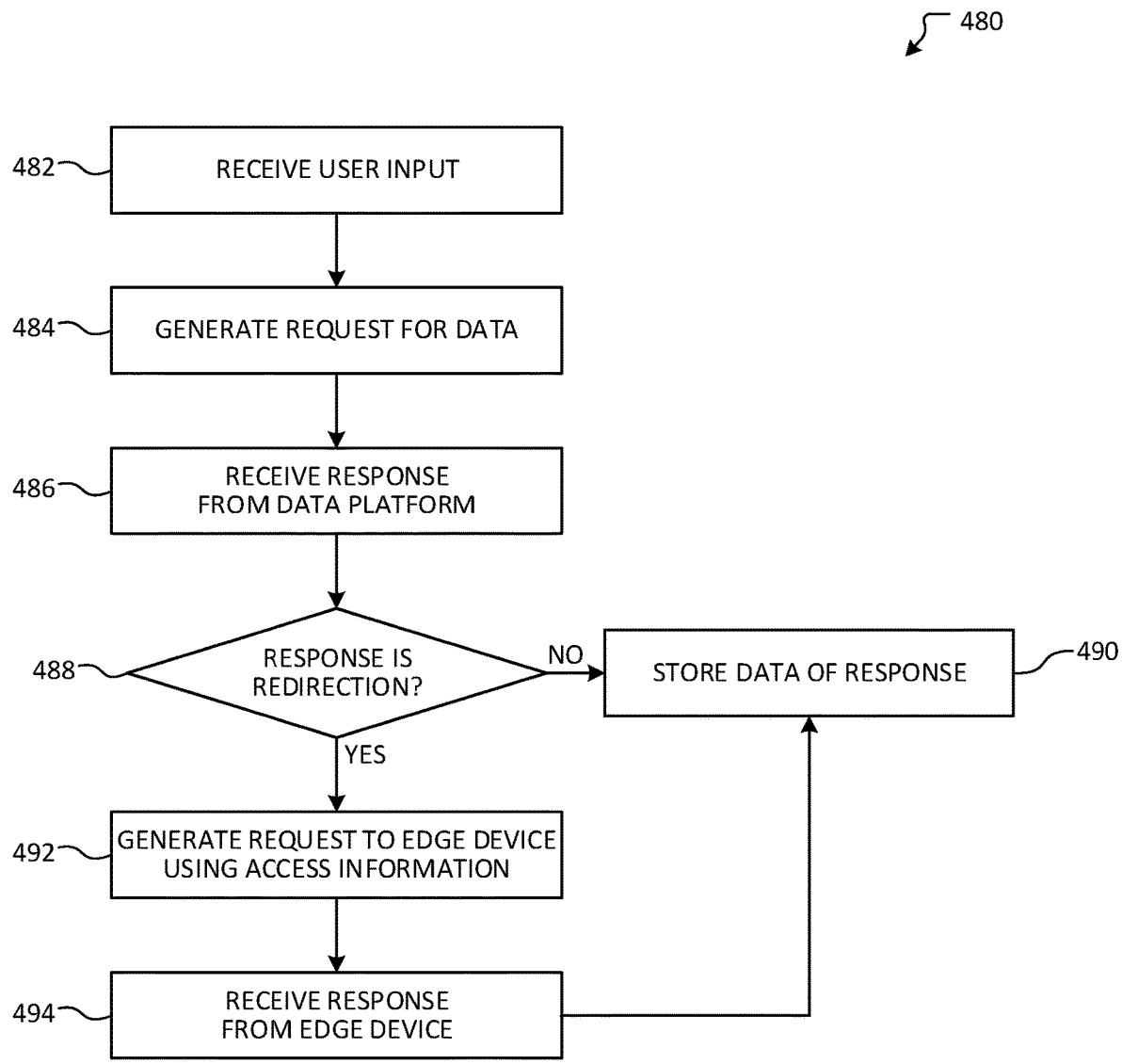
FIG. 4C illustrates an overview of an example method for requesting data of a data platform according to aspects of the present disclosure.

FIG. 4C illustrates an overview of an example method 480 for requesting data of a data platform according to aspects of the present disclosure. In examples, aspects of method 480 are performed by an access application, such as access application 122 of computing device 106 discussed above with respect to FIG. 1.

Method 480 begins at operation 482, where user input is received. In examples, the user input may be received as a typed search query, as one or more selections from a set of filters, and/or as a selection of a specific record, among other examples. As a further example, a user may select a search query from a set of saved search queries. Thus, it will be appreciated that any of a variety of techniques may be used to input a search query for use with aspects of the present disclosure.

Flow progresses to operation 484, where a request for data from a data platform is generated (e.g., data platform 102 in FIG. 1). For example, the request may be generated according to a specific protocol and/or data format. In some examples, the request may similarly comprise an indication as to a protocol with which the data is to be accessed and/or a format in which the data should be provided.

Accordingly, at operation 486, a response is received from the data platform. For example, the response may be received from a data platform similar to data platform 102 in FIG. 1, which may be performing aspects of method 400 discussed above with respect to FIG. 4A.

At determination 488, it is determined whether the response is a redirection indication (e.g., as discussed above with respect to operations 408 and 410 of method 400 in FIG. 4A). Accordingly, if it is determined that the response is not a redirection indication, flow branches "NO" to operation 490, where the data is stored. For example, the data platform may have provided the data or information usable to retrieve the data that is responsive to the request. For example, the data may be received according to a format that was indicated in the request that was generated at operation 484.

Thus, operation 490 may further comprise accessing the data according to such information. For example, a specific URL and/or protocol may be used to access the data. While method 480 is described in a context where the requested data is stored, it will be appreciated that any of a variety of additional or alternative processing may be performed using the data. Method 480 terminates at operation 490.

In other instances, it may be determined that the response is a redirection indication, such that flow instead branches "YES" to operation 492, where the data is requested from an edge device (e.g., edge device 104 in FIG. 1). In such instances, the redirection indication may comprise authentication information that may be included in the generated request at operation 492. For example, an authorization token may be included. Other aspects of the request to the edge device may be similar to those discussed above with respect to operation 484.

Accordingly, a response is received from the edge device at operation 494. For example, the edge device may be performing aspects of method 440 discussed above with respect to FIG. 4B. As noted above with respect to the response from the data platform, the response may comprise data or may comprise information usable to access the data from the edge device. Flow then progresses to operation 490, which is described above. Method 480 terminates at operation 490.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, described herein.

Figure 5:
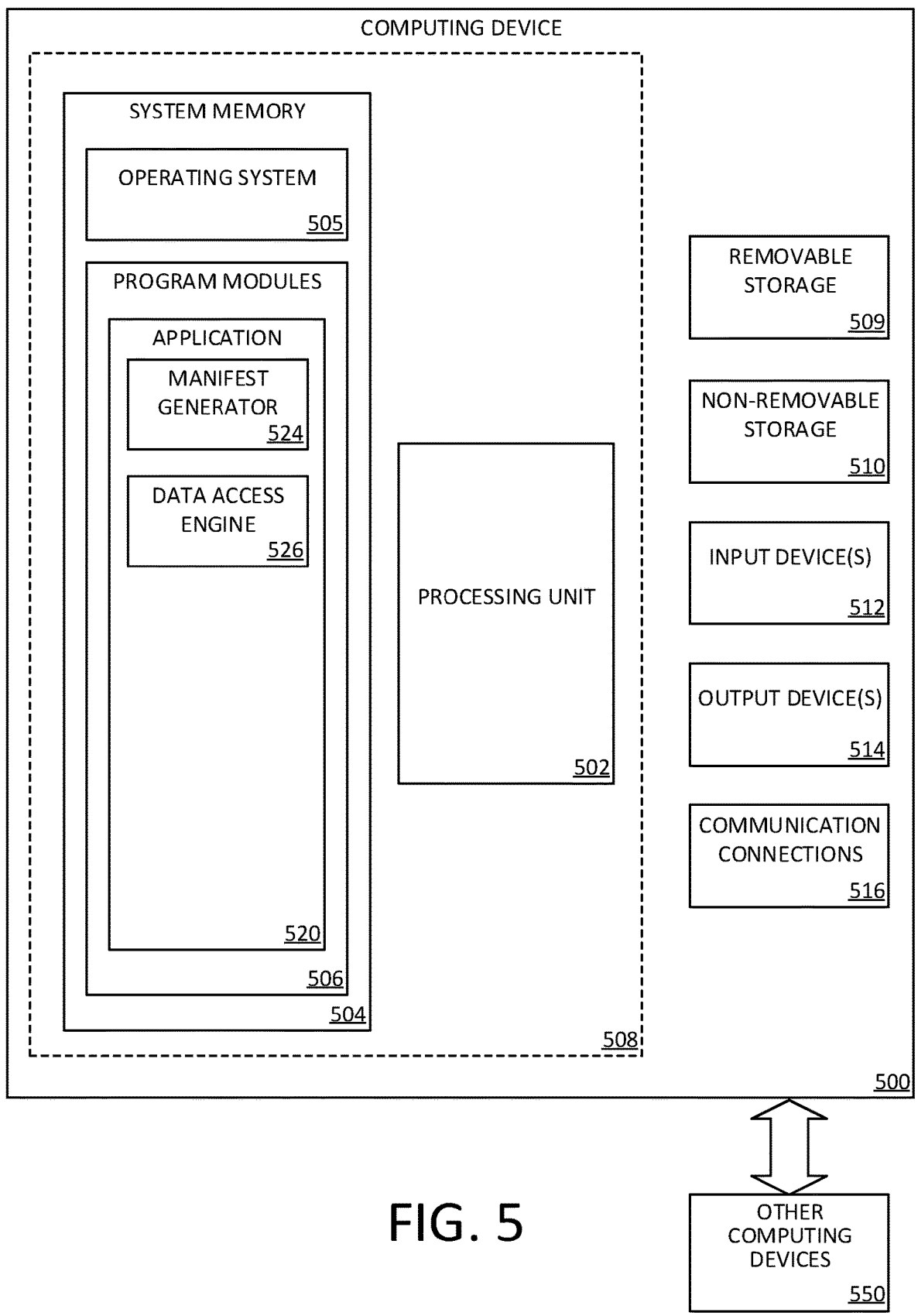
FIG. 5 is a block diagram illustrating example physical components of a computing device with which aspects of the disclosure may be practiced.

FIG. 5 is a block diagram illustrating physical components (e.g., hardware) of a computing device 500 with which aspects of the disclosure may be practiced. The computing device components described below may be suitable for the computing devices described above, including data platform 102, edge device 104, and computing device 106 in FIG. 1. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories.

The system memory 504 may include an operating system 505 and one or more program modules 506 suitable for running software application 520, such as one or more components supported by the systems described herein. As examples, system memory 504 may store manifest generator 524 and data access engine 526. The operating system 505, for example, may be suitable for controlling the operation of the computing device 500.

Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., application 520) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
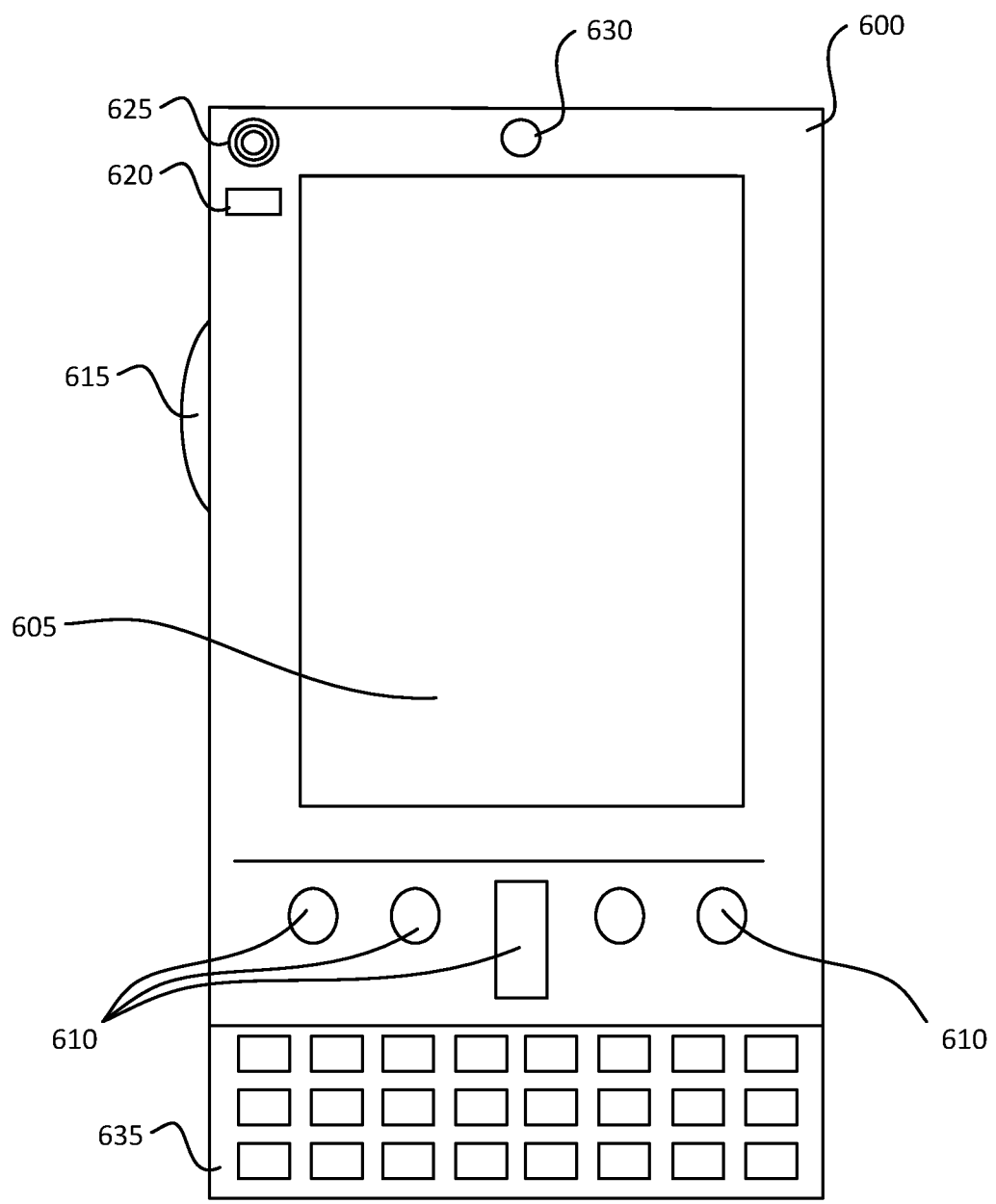
FIGS. 6A and 6B are simplified block diagrams of a mobile computing device with which aspects of the present disclosure may be practiced.
Figure 6B:
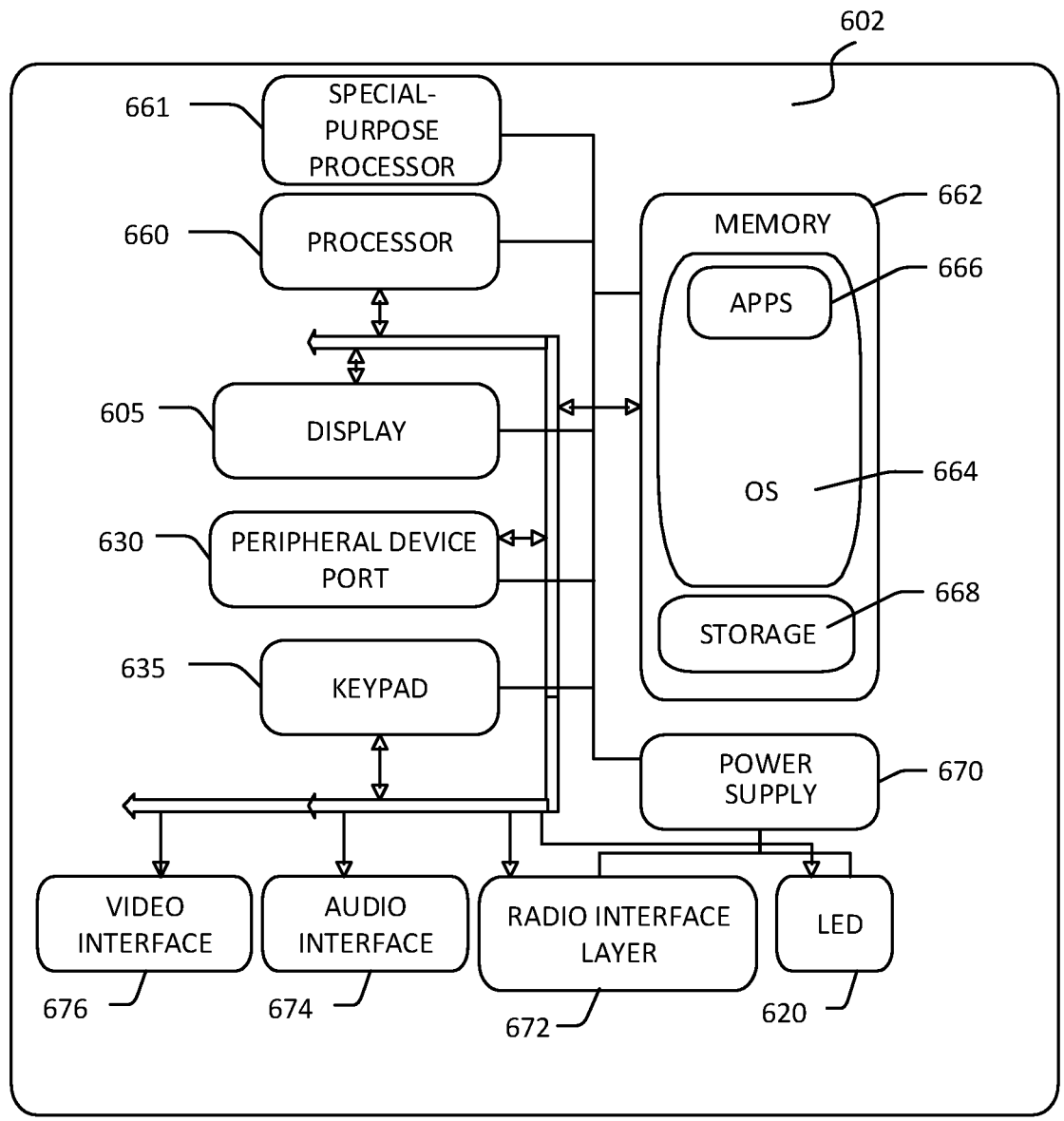

FIGS. 6A and 6B illustrate a mobile computing device 600, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 6A, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments.

In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display.

In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one embodiment, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600 described herein (e.g., search engine, extractor module, relevancy ranking module, answer scoring module, etc.).

The system 602 has a power supply 670, which may be implemented as one or more batteries. The power supply 670 might further include an external power source, such as an AC adapter or a powered docking cradle that supplements or recharges the batteries.

The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

Figure 7:
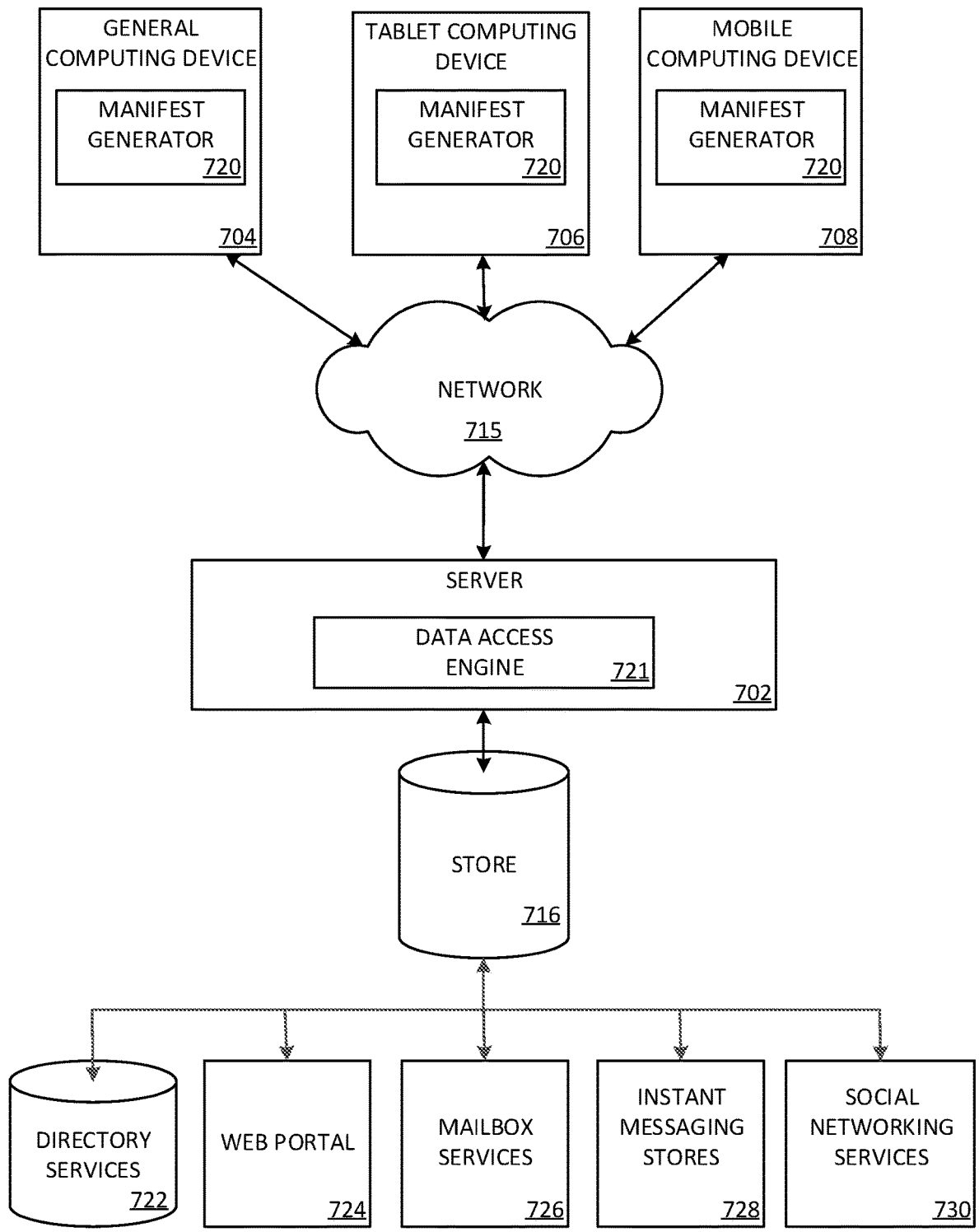
FIG. 7 is a simplified block diagram of a distributed computing system in which aspects of the present disclosure may be practiced.

FIG. 7 illustrates one aspect of the architecture of a system for processing data received at a computing system from a remote source, such as a personal computer 704, tablet computing device 706, or mobile computing device 708, as described above. Content displayed at server device 702 may be stored in different communication channels or other storage types. For example, various documents may be stored using a directory service 722, a web portal 724, a mailbox service 726, an instant messaging store 728, or a social networking site 730.

A manifest generator 720 may be employed by a client that communicates with server device 702, and/or data access engine 721 may be employed by server device 702. The server device 702 may provide data to and from a client computing device such as a personal computer 704, a tablet computing device 706 and/or a mobile computing device 708 (e.g., a smart phone) through a network 715. By way of example, the computer system described above may be embodied in a personal computer 704, a tablet computing device 706 and/or a mobile computing device 708 (e.g., a smart phone). Any of these embodiments of the computing devices may obtain content from the store 716, in addition to receiving graphical data useable to be either pre-processed at a graphic-originating system, or post-processed at a receiving computing system.

Figure 8:
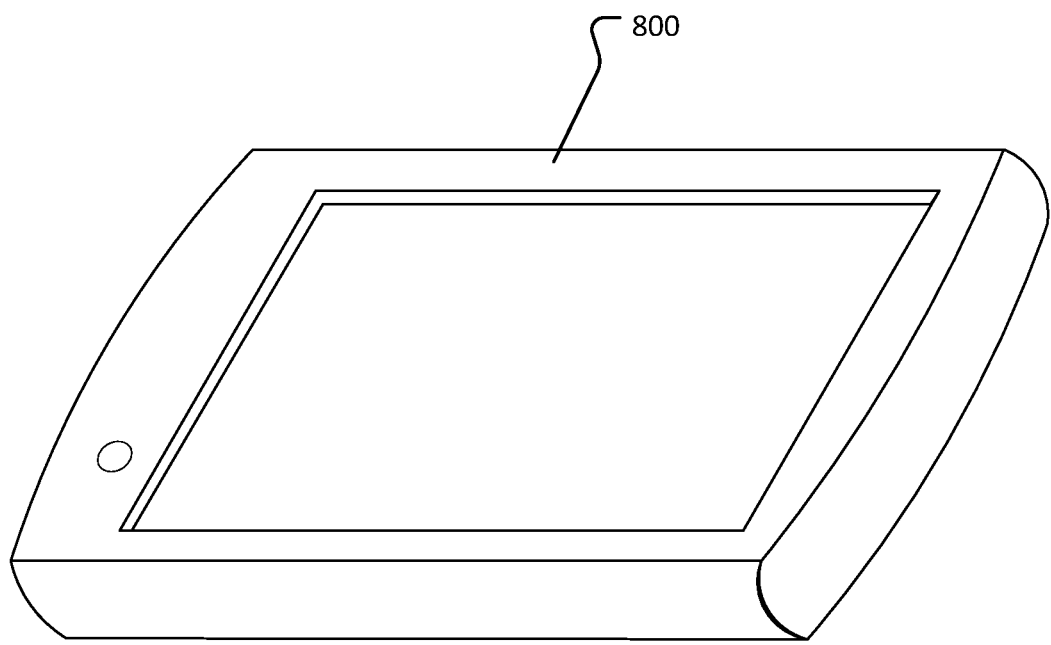
FIG. 8 illustrates a tablet computing device for executing one or more aspects of the present disclosure.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and memory storing instructions that, when executed by the at least one processor, causes the system to perform a set of operations. The set of operations comprises: receiving, by the system, data from a data source; processing the data to generate a local processing result; generating a manifest indicating an association between a part of the received data and the system; providing, to a data platform, the local processing result and the manifest; providing the part of the received data to the data platform; and generating an updated manifest that omits the association between the part of the received data and the system. In an example, processing the data comprises identifying a first group of data comprising the local processing result and a second group of data comprising the part of the received data; and the first group of data has a higher priority than the second group of data. In another example, the first group of data is provided to the data platform substantially contemporaneously with receipt of the data from the data source; and the second group of data is provided to the data platform in response to identifying computing resource availability. In a further example, the set of operations further comprises: receiving, from the data platform, a platform processing result; and updating the manifest to indicate an association between the platform processing result and the system. In yet another example, the platform processing result is associated with the local processing result and data of another edge device. In a further example, the set of operations further comprises: receiving, from a computing device, a request for data comprising authentication information; validating the request for data using the authentication information; and when the request for data is validated: identifying, using the manifest, response data associated with the request for data; and providing, in response to the request for data, the identified response data. In another example, the authentication information comprises an authorization token associated with the data platform.

In another aspect, the technology relates to a method for ingesting data from an edge device associated with a data platform. The method comprises: receiving, from a first edge device, first data and a first manifest; receiving, from a second edge device, second data and a second manifest; generating an aggregated manifest based on the first manifest and the second manifest, wherein the aggregated manifest comprises: an association between a first part of data and the first device; and an association between a second part of data and the second device; generating a platform processing result based on the first data and the second data; providing, to a recipient edge device that is the first edge device or the second edge device, the platform processing result; and generating an updated aggregated manifest to comprise an association between the platform processing result and the recipient edge device. In an example, the method further comprises: receiving, from a computing device, a request for data of the data platform; determining, based on the updated aggregated manifest, a storage location of requested data associated with the request; and when it is determined the storage location is the data platform, providing at least a part of the requested data in response to the request. In another example, the method further comprises: receiving, from a computing device, a request for data of the data platform; determining, based on the updated aggregated manifest, a storage location of requested data associated with the request; and when it is determined the storage location is an edge device: generating authentication information for the computing device; and providing, in response to the request, a redirection indication comprising the authentication information and an indication of the edge device. In a further example, generating the authentication information comprises communicating with the edge device to generate an authorization token. In yet another example, the method further comprises: receiving, from the first edge device, third data having a lower priority than the first data; and updating the manifest to omit an association between the third data and the first edge device. In a further still example, the first data and the second data each have the same priority.

In a further aspect, the technology relates to a method for processing data by an edge device of a data platform. The method comprises: receiving, by the edge device, data from a data source; processing the data to generate a local processing result; generating a manifest indicating an association between a part of the received data and the edge device; providing, to a data platform, the local processing result and the manifest; providing the part of the received data to the data platform; and generating an updated manifest that omits the association between the part of the received data and the edge device. In an example, processing the data comprises identifying a first group of data comprising the local processing result and a second group of data comprising the part of the received data; and the first group of data has a higher priority than the second group of data. In another example, the first group of data is provided to the data platform substantially contemporaneously with receipt of the data from the data source; and the second group of data is provided to the data platform in response to identifying computing resource availability. In a further example, the method further comprises: receiving, from the data platform, a platform processing result; and updating the manifest to indicate an association between the platform processing result and the edge device. In yet another example, the platform processing result is associated with the local processing result and data of another edge device. In a further still example, the method further comprises: receiving, from a computing device, a request for data comprising authentication information; validating the request for data using the authentication information; and when the request for data is validated: identifying, using the manifest, response data associated with the request for data; and providing, in response to the request for data, the identified response data. In another example, the authentication information comprises an authorization token associated with the data platform.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory storing instructions that, when executed by the at least one processor, causes the system to perform a set of operations, the set of operations comprising:
   processing data from a data source to generate:
   a first local processing result having a first priority; and
   a second local processing result having a second priority, wherein the second priority is lower than the first priority;
   generating a manifest indicating an association between the system and a part of the data that corresponds to the second local processing result;
   providing, to a data platform, the first local processing result and the manifest; and
   retaining the second local processing result at the system as a result of the second priority being lower than the first priority.

2. The system of claim 1, wherein providing the first local processing result further comprises providing at least a part of the data that corresponds to the first local processing result.

3. The system of claim 1, wherein the set of operations further comprises:

identifying a change in computing resource availability; and
in response to identifying the change, providing, to the data platform, the second local processing result and an updated manifest that omits the association between the system and the part of the data that corresponds to the second local processing result.

4. The system of claim 3, wherein providing the second local processing result further comprises providing at least a part of the data that corresponds to the second local processing result.

5. The system of claim 1, wherein the set of operations further comprises:
   receiving, from a computing device, a request for data;
   identifying, using the manifest, response data associated with the request for data; and
   providing, in response to the request for data, the identified response data.

6. The system of claim 1, wherein the set of operations further comprises:
   receiving, from the data platform, a platform processing result; and
   updating the manifest to indicate an association between the system and the platform processing result.

7. The system of claim 6, wherein the platform processing result is associated with one or more of a local processing result or data of another edge device.

8. A method for processing data from a data source at an edge device, the method comprising:
   obtaining data from a data source;
   identifying, within the data, a first group of data having a first priority and a second group of data having a second priority, wherein the second priority is lower than the first priority;
   providing, to a data platform, the first group of data and a manifest indicating an association between the edge device and the second group of data; and
   retaining the second group of data at the edge device as a result of identifying a first level of computing resource availability.

9. The method of claim 8, wherein providing the first group of data further comprises providing a local processing result corresponding to the first group of data.

10. The method of claim 8, further comprising:
    identifying a second level of computing resource availability different than the first level of computing resource availability; and
    in response to identifying the second level of computing resource availability, providing, to the data platform, the second group of data and an updated manifest that omits the association between the edge device and the second group of data.

11. The method of claim 10, wherein providing the second group of data comprises providing a local processing result corresponding to the second group of data.

12. The method of claim 8, further comprising:
    receiving, from a computing device, a request for data;
    identifying, using the manifest, response data associated with the request for data; and
    providing, in response to the request for data, the identified response data.

13. The method of claim 8, further comprising:
    receiving, from the data platform, a platform processing result; and
    updating the manifest to indicate an association between the edge device and the platform processing result.

14. A method for processing data from a data source at an edge device, the method comprising:
  processing data from a data source to generate:
    a first local processing result having a first priority; and
    a second local processing result having a second priority, wherein the second priority is lower than the first priority;
  generating a manifest indicating an association between the edge device and a part of the data that corresponds to the second local processing result;
  providing, to a data platform, the first local processing result and the manifest; and
  retaining the second local processing result at the edge device as a result of the second priority being lower than the first priority.

15. The method of claim 14, wherein providing the first local processing result further comprises providing at least a part of the data that corresponds to the first local processing result.

16. The method of claim 14, further comprising:
  identifying a change in computing resource availability; and
  in response to identifying the change, providing, to the data platform, the second local processing result and an updated manifest that omits the association between the edge device and the part of the data that corresponds to the second local processing result.

17. The method of claim 16, wherein providing the second local processing result further comprises providing at least a part of the data that corresponds to the second local processing result.

18. The method of claim 14, further comprising:
  receiving, from a computing device, a request for data;
  identifying, using the manifest, response data associated with the request for data; and
  providing, in response to the request for data, the identified response data.

19. The method of claim 14, further comprising:
  receiving, from the data platform, a platform processing result; and
  updating the manifest to indicate an association between the edge device and the platform processing result.

20. The method of claim 19, wherein the platform processing result is associated with one or more of a local processing result or data of another edge device.

* * * * *